Sheet 1-2 Sheets
L. G. Kniffen.
Mower.
N°67882. Patented Aug 20, 1867.
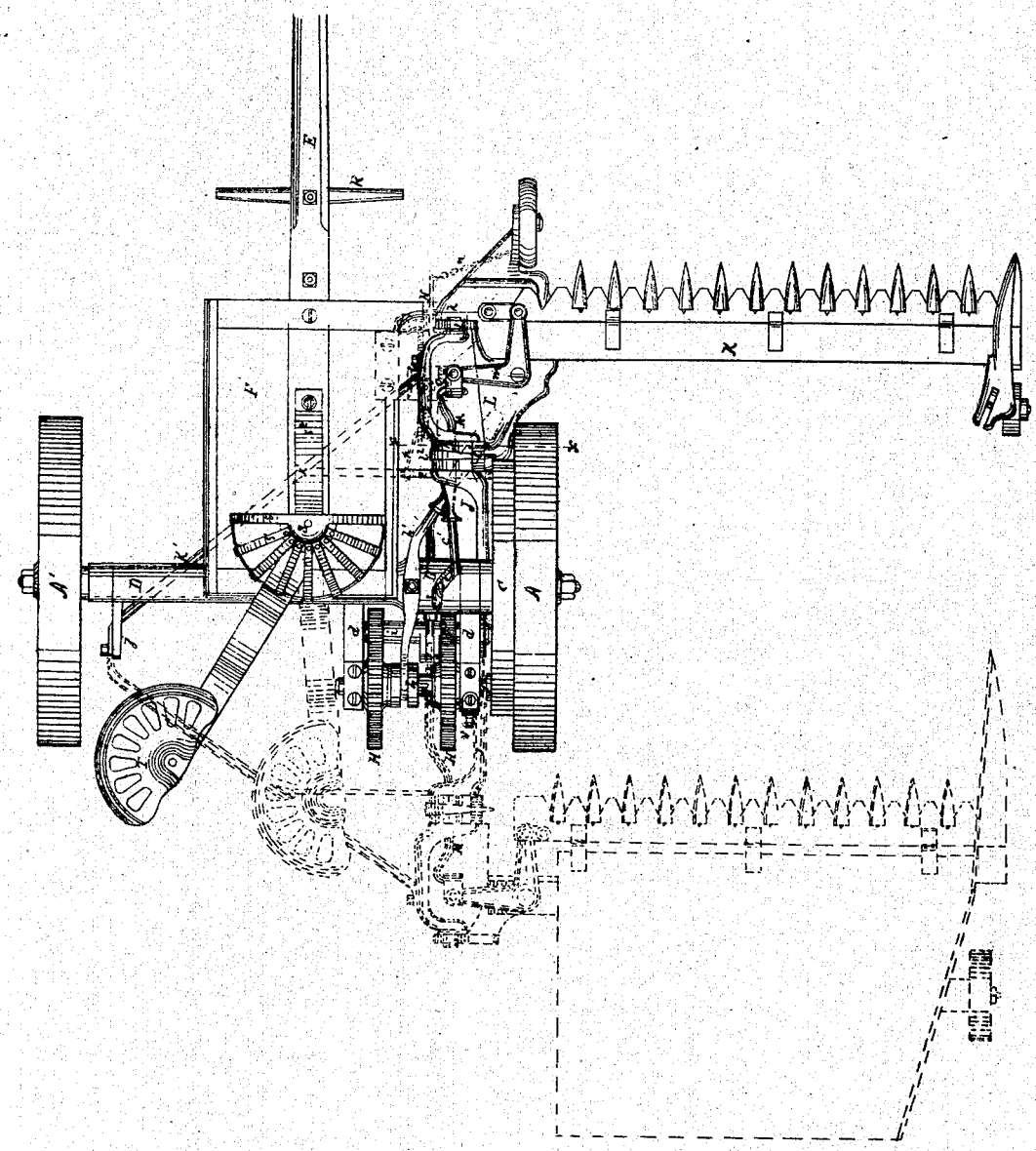
Inventor

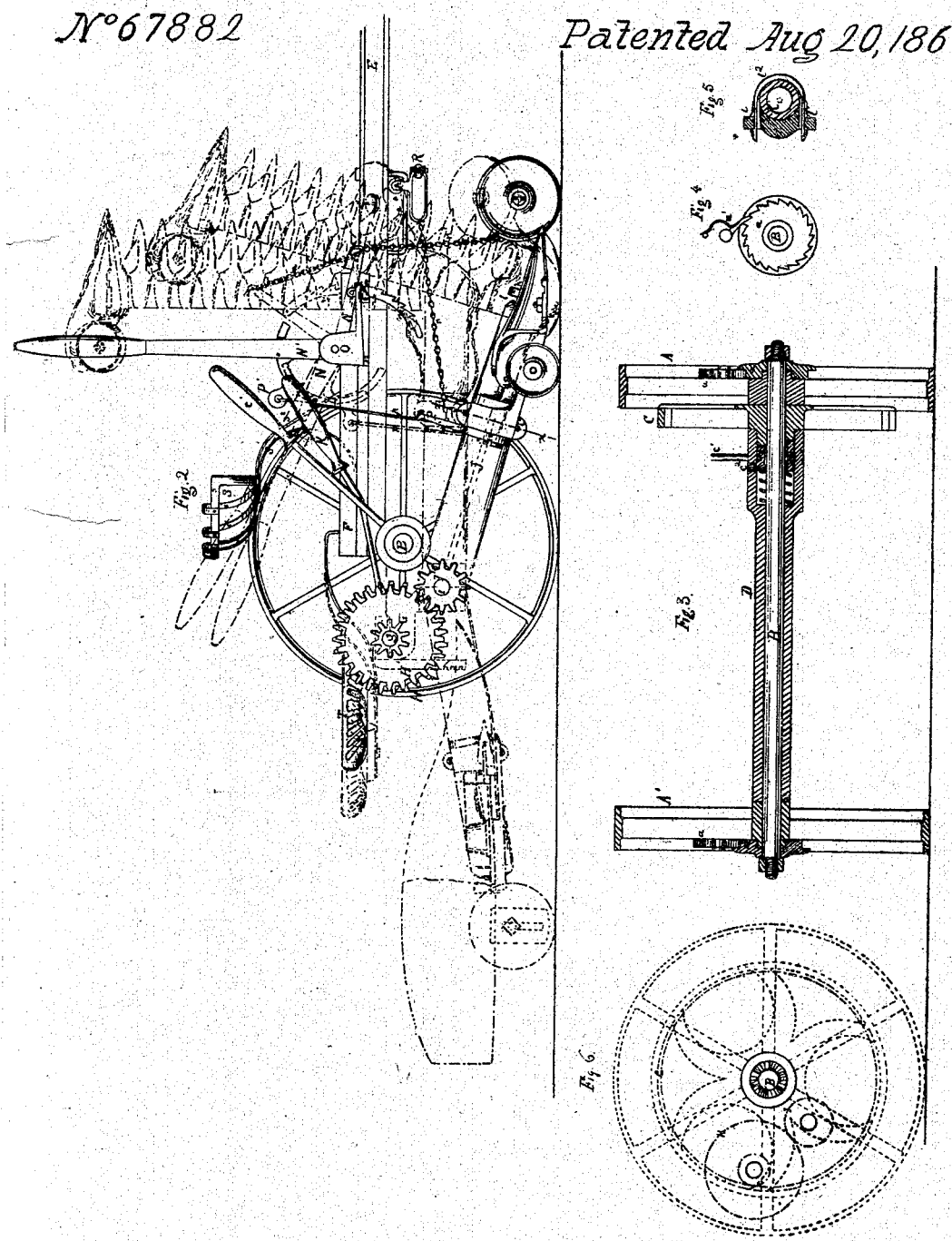

United States Patent Office.

L. G. KNIFFEN, OF WORCESTER, MASSACHUSETTS.

Letters Patent No. 67,882, dated August 20, 1867.

---

IMPROVEMENT IN HARVESTERS.

---

*The Schedule referred to in these Letters Patent and making part of the same.*

---

TO ALL WHOM IT MAY CONCERN:

Be it known that I, L. G. KNIFFEN, of the city and county of Worcester, and State of Massachusetts, have invented certain new and useful Improvements in Harvesters, of which the following is a full, clear, and exact description, reference being had to the accompanying drawings, which make part of this specification, and in which—

Figure 1 represents a plan or top view of a harvester embracing my improvements, the black lines showing the parts as arranged for mowing, while the red lines show them as arranged for reaping.

Figure 2 represents a view in elevation of one side of the same, with the inner driving-wheel and main gear-wheel removed. The black lines show the finger-beam resting on the ground, as in fig. 1; the blue lines show the finger-beam raised to pass obstructions; while the red lines in front of the main axles show the finger-beam both raised and tilted for convenience of transportation; the red lines behind the main axle show the reaper-attachment, as in fig. 1.

Figure 3 is a vertical longitudinal section through the main axle.

Figure 4 shows the details of the backing ratchets.

Figure 5, a vertical transverse section through the coupling-arm at the line $x\,x$ of fig. 1, and Figure 6 a diagram of the gearing, the red lines representing the pitch line of the teeth.

My invention relates to that class of two-wheeled hinge-joint harvesters which can be converted from mowers into reapers, and from front-cut to rear-cut machines, or *vice versa*, and more especially to machines in which the main frame, the gearing, and the driver's seat are all maintained in one relative position by a rigid tongue or shafts, while the cutting apparatus is so connected to the main frame, by coupling-arms, as freely to rise and fall to conform to the undulations of the ground over which it is drawn.

The improvement herein claimed consists, first, in a novel mode of throwing the mechanism into and out of gear; second, in a novel mode of varying the speed of the cutters.

In the accompanying drawings, which exemplify one convenient mode of carrying out my invention, two driving and supporting-wheels, A A', are shown as turning loosely on the main axle B, to which suitable backing ratchets, $a$, figs. 3 and 4, are firmly secured, so as to turn with the axle. Spring-pawls $a'$ on the wheels take into these ratchets and turn the axle when moving forward, but slip over them without turning the axle, in the usual way, when backing. The main gear-wheel C is independent of the driving-wheel, and plays loosely on the axle, being provided with a spring-backing ratchet, $c$, figs. 1, 3, and 6, which permits the axle to turn backwards, but which turns with it when moving forwards. This wheel can be thrown out of gear, when desired, by means of a hand-lever, $c^1$, moving in an eccentric slot, $c^2$, in the tubular bed-piece D, which encloses the axle. It will be seen that the ends of the wheel-hubs and bed-piece abut against each other, and thus render the use of collars unnecessary. A tongue, E, is attached to the bed-piece, and supports a frame, F, which carries the lifting devices, and driver's and raker's seats. The main gear-wheel C drives a corresponding spur-pinion, G, on a counter-shaft, $g$, mounted in brackets $d$ projecting from the bed-piece D, and carrying two spur-wheels H H'. These wheels are mounted loosely on the counter-shaft, and can be alternately thrown into or out of gear by a sliding-clutch and feather, $h$, operated by a hand-lever, $h'$. They gear into corresponding pinions, I I', on the crank-shaft $i$, mounted in the same brackets, so as to rotate parallel to the main axle. The wheel H is of a diameter greater than its fellow, while the corresponding pinion I is of less diameter than its fellow, so that by changing from one set to the other the speed of the cutters can be increased or diminished at pleasure, to adapt the machine to the change from a reaper to a mower, or *vice versa*. A coupling-arm, J, is pivoted to the bracket $d$, in line with the crank-shaft $i$, and is curved in the peculiar form shown in the drawings. The coupling-arm is braced by a diagonal lever, K', pivoted to a down-hanger, $j$, secured to the bed-piece D. The finger-beam K is pivoted to the coupling-arm by means of a shoe, L, formed of the peculiar shape shown in the drawings, and having a loop, $l$, to fit on a corresponding stud, $k$, on the coupling-arm, and a yoke or fork, $l'$, to encircle the tubular part $k'$ of the coupling-arm, through which the pitman M passes. The fork is clasped upon the coupling-arm by a bow-spring, $l^2$, which slips into loops on the yoke, and is held by square shoulders on its ends, as clearly shown in figs. 1 and 5. By this means the finger-beam and coupling-arm are firmly connected, so as to resist lateral strains, while the finger-beam is free to swing round the coupling-arm, to allow either end to rise or fall to conform to the undulations of the ground. The cutters are vibrated by means of a bell-crank or elbow-lever, m, pivoted to play horizontally on the shoe L, and driven by the pitman M. The cutting apparatus is raised or lowered by means of a bell-crank lever, N, pivoted to play vertically in a socket, O, attached to the inner front corner of the frame. The toe of this lever is connected to the finger-beam by a cord or chain, n. A swinging-ratchet, n', is likewise hung to this toe by its upper end, so as to pass through a loop in the bracket. As the lever rises the ratchet rises endwise through its loop, and its gravity causes it to swing forward, so that when the lever is released the teeth abut against the front part of the loop and prevent the descent of the finger-beam. The ratchet is released from the loop by the foot of the driver. The hand-lever N', which works the lifting-lever, is not permanently attached thereto, but is pivoted concentrically with it, and works against a shoulder, o, on it, so that by first moving the hand-lever laterally a little way it can be vibrated without affecting the lifting device. The above-described device lifts the finger-beam horizontally only. In order, however, to lift its outer end so as to fold it up against the main frame, I attach an arm, P, to the shoe L, in rear of but parallel to the finger-beam, and connect said rod by a link, p, to a curved rocking-lever, P', vibrating on the same pivot as the hand-lever N', and moving both concentrically and parallel therewith. The hand-lever N' abuts against a shoulder, o', on this rocking-lever, similar to that on the lifting-lever, and can thus be made to act upon it at pleasure. By moving this lever backward the outer end of the arm P is depressed, while the divider end of the finger-beam is correspondingly elevated, the coupling-arm J serving as a fulcrum. I am thus enabled to lift the outer end of the finger-beam and to raise it horizontally by the use of a single lever. The horses are attached to a double-tree or evener, R, which is connected by a chain, r, to the brace-rod K', and slides in a loop, e, underneath the tongue. By this device the pull of the team tends to lift the cutting apparatus and thus diminish its pressure upon the ground. By adjusting the rear end of the chain higher or lower, which can readily be done by a short post on the brace-bar, the angle of the draught, and consequently the lifting strain exerted, can be varied at pleasure. The driver's seat S consists of a frame, s, to which a series of radial ribs or springs, $s^1$, is secured. These springs are curved over the back of the seat, as shown in the drawings. By this means each spring is independent, and yields as the strain is thrown upon it, thus preventing shocks and jars to the driver. In order to secure a seat capable of yielding vertically, and yet prevent too great a backward and forward movement, I mount it on a U-shaped spring, S', having its open end to the rear, and stiffen it by an S-shaped spring, $s^2$, the upper end of which conforms to the shape of the supporting spring, in order to stiffen it, while its lower end extends forward and is bolted to the frame. By this mode of construction pressure is exerted longitudinally, instead of transversely to the spring, and greater stiffness is attained.

The above description applies to my improved machine as adapted for mowing.

To change from a mower to a reaper, the lifting, tilting, and drawing-cords n, p, and r, are detached from the shoe and brace-bar respectively. The pitman is also disconnected from the bell-crank, and the bow-spring P withdrawn from its loops. The shoe L, with the cutting apparatus, &c., is then removed. The coupling-arm and brace-bar are then swung round their pivots, (passing under the frame,) so as to project in rear of the main axle, as shown in red lines in figs. 1 and 2. A cutting apparatus and platform suitable for reaping are then attached. In this instance it will be seen that the shoe L has its parts reversed to match the coupling-arm, the yoke being in front and the loop in the rear.

The raker rides upon a seat, T, projecting behind the axle, and so pivoted as to swing horizontally in the arc of a circle towards and from the platform. The raker rides with his feet upon the coupling-arm and brace-bar, and draws the grain off with a rake, his side being towards the driver.

By using a front-cut machine the side draught is diminished, the driver has a better view of the cutters, and is not liable to be thrown upon them and injured; while by changing to a rear-cut, while reaping, I am enabled to discharge the gavel behind and between the driving-wheels, and out of the path of the team in cutting the next swath, by moving it the least practicable distance, and also maintain the proper balance of the machine. The divider side of the platform is sustained by the usual grain-wheel, while the gearing side is upheld by a spring-catch on the frame, which takes into a suitable detent on the coupling-arm. Both wheel and detent may be made capable of adjustment, so as to set the platform at any required elevation.

What I claim herein as my invention, and desire to secure by Letters Patent, is—

1. The combination, substantially as described, with the main axle, of the main gear-wheel C, the spring-ratchet c, the eccentrically slotted tubular bed-piece D, and the shipping-lever c', for the purpose of throwing the mechanism into and out of gear.

2. The combination, as described, of the main gear-wheel, the counter-shaft, carrying gears of different sizes, and a shipping-lever, with the crank-shaft and its pinions, all the axles being arranged with their axes parallel to each other, for the purpose of changing the speed to adapt the machine to either reaping or mowing.

In testimony whereof I have hereunto subscribed my name.

L. G. KNIFFEN.

Witnesses:
GEO. A. KIMBALL,
WM. S. BICKFORD.